(No Model.)

H. WATERER.
FLOWER POT HOLDER.

No. 577,800. Patented Feb. 23, 1897.

WITNESSES:

INVENTOR
H. Waterer
BY
ATTORNEYS.

UNITED STATES PATENT OFFICE.

HOSEA WATERER, OF PHILADELPHIA, PENNSYLVANIA.

FLOWER-POT HOLDER.

SPECIFICATION forming part of Letters Patent No. 577,800, dated February 23, 1897.

Application filed April 17, 1896. Serial No. 587,942. (No model.)

*To all whom it may concern:*

Be it known that I, HOSEA WATERER, of Philadelphia, in the county of Philadelphia and State of Pennsylvania, have invented a new and Improved Flower-Pot Holder, of which the following is a full, clear, and exact description.

The object of this invention is to provide a superior holder for flower-pots and one of that class with which it is possible effectively to drain the pot of all superfluous water, providing in the holder a receptacle for this water, in which receptacle the water may be contained until its removal is convenient.

In carrying out my invention I employ a body or holder proper provided with an upper portion capable of receiving the pot and a lower portion communicating with the upper portion and receiving the water therefrom. In this lower portion is situated a removable support of a peculiar construction, to be hereinafter described, and forming a rest upon which the flower-pot is to be held.

The invention will be fully described hereinafter and defined in the claims.

Reference is to be had to the accompanying drawings, forming a part of this specification, in which similar characters indicate corresponding parts in all the figures.

Figure 1:
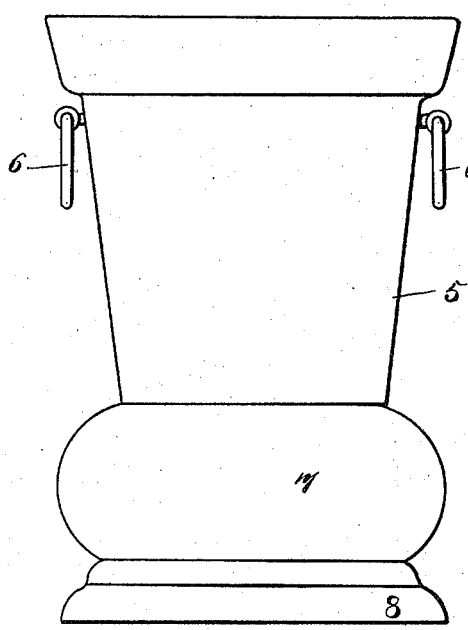
Figure 2:
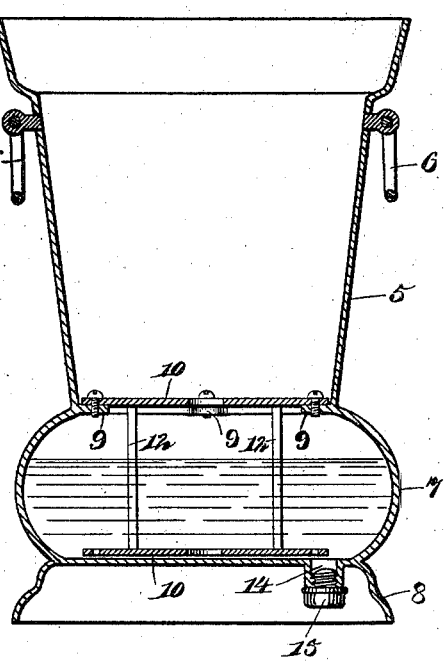
Figure 3:
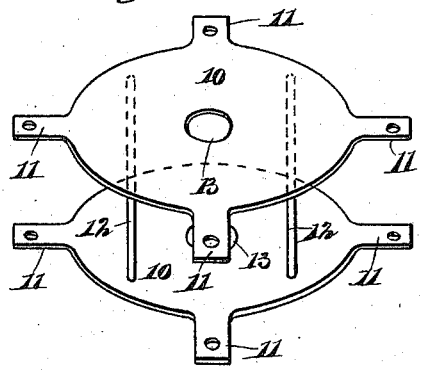

Figure 1 is a side elevation of my invention. Fig. 2 is a vertical section thereof. Fig. 3 is a detail perspective of the support shown in Fig. 2, and Fig. 4 is a detail perspective of a modified form of the support.

My flower-pot holder, as shown in the drawings, is provided with an upper portion 5, having bails or handles 6 and forming an inclosure for the flower-pot. Integral with the upper portion 5 is a base or reservoir-section 7, provided at its lower side with a downwardly-projecting skirt or flange 8, forming a support, and having at its upper edge and at that point where it is joined with the section 5 a series of horizontally and inwardly projecting lugs 9. These lugs are preferably four in number and disposed equidistant throughout the interior of the circumference of the reservoir or base 7.

As shown in Figs. 2 and 3, the support for the pot consists in duplicate circular plates 10, each having four outwardly-projecting and equidistant lugs 11 and being rigidly connected by rods 12. The plates 10 are held in vertical alinement with each other, and when in place, as shown in Fig. 2, the lugs 11 of the upper plate 10 are respectively bolted to the lugs 9, while the lower plate 10 rests on or immediately above the bottom of the base or reservoir 7. Each plate 10 is provided with a central perforation 13, so that the water may pass from the flower-pot into the base or reservoir 7, and thence be readily withdrawn from the latter through a spout 14 in the bottom of the reservoir and normally commanded by a plug 15. Should the lugs 11 of either plate 10 be broken, the holder in Figs. 2 and 3 may be readily reversed, so as to present the lugs 11 of the remaining plate to the lugs 9. It will thus be seen that the holder is from this construction made reversible.

Figure 4:
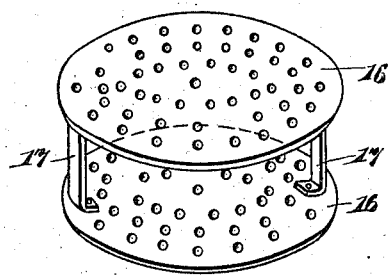

The form of support shown in Fig. 4 consists in two plates 16, each closely perforated and rigidly held in superposed position by means of rods 17. This form of support is used the same as the form shown in Figs. 2 and 3, the only difference being that the lugs 11 are dispensed with and the support has no rigid connection with the holder, the lower plate of the support merely resting on the bottom of the receptacle 7 and the upper plate being held level with the lugs 9, so as to properly support the flower-pot. By these means it will be seen that the holder may conveniently carry a flower-pot in its upper portion 5, such pot being sustained by the upper plate of the support, and when the flower within the pot is irrigated the water will pass from the pot and into the base or reservoir 7. By these means the full benefit of the water is applied to the plant, and at the same time the water is prevented from accumulating within the pot and the plant is effectively preserved.

Having thus described my invention, I claim as new and desire to secure by Letters Patent—

1. A flower-pot holder having an upper portion capable of receiving the flower-pot, a base or reservoir communicating with the upper portion, and a support located within the base or reservoir and supported on the bottom thereof, the support having a plate at its upper portion which extends to and forms the bottom of the upper portion of the holder, substantially as described.

2. A flower-pot holder comprising an upper portion capable of receiving the pot, a base or reservoir communicating with the upper portion, and a support contained within the base or reservoir and capable of sustaining the flower-pot within the upper portion, the holder having two plates rigidly held in superposed position, substantially as described.

3. A flower-pot holder comprising an upper portion capable of receiving the flower-pot, a base or reservoir communicating with the upper portion, and a support held by the base or reservoir and capable of sustaining the flower-pot in the said upper portion, the support consisting of two perforated plates rigidly held in superposed positions, substantially as described.

4. A flower-pot holder having an upper portion capable of receiving a flower-pot, a base or reservoir communicating with the upper portion, and a support contained within the base or reservoir and capable of sustaining the flower-pot within said upper portion, the support having two plates closely perforated throughout and rigidly held in superposed positions, substantially as described.

HOSEA WATERER.

Witnesses:
BARTLE C. BERKELBACH,
BUSHROD W. MUSSELMAN.